United States Patent Office 3,120,565
Patented Feb. 4, 1964

3,120,565
PREPARATION OF 2,2'-DIPOTASSIO-DIPHENYLAMINES
Janos Kollonitsch, Westfield, N.J., assignor to Merck & Co., Inc., Rahway, N.J., a corporation of New Jersey
No Drawing. Filed Mar. 31, 1961, Ser. No. 99,727
2 Claims. (Cl. 260—576)

This invention relates to phenazasiline derivatives and more particularly to a method of preparation of phenazasiline compounds useful as antioxidants in high temperature lubricants.

Phenazasiline compounds have been found to be useful as antioxidants in high temperature lubricants, particularly those of the synthetic ester type. The compound 5-ethyl-10,10-diphenylphenazasiline, for example, is capable of withstanding temperatures in the range of 400° F. and higher.

Accordingly an object of the present invention is to provide an improved method of synthesis of phenazasiline derivatives.

A more specific object of this invention is to provide an improved method of preparing 5-(lower alkyl)-10,10-diphenylphenazasiline.

These and other objects will appear more fully in the disclosure which follows.

In accordance with the present invention there is provided an improved method of synthesis of phenazasilines, particularly those of the 5-(lower alkyl)-10,10-diphenyl-phenazasiline class, represented by the following formula:

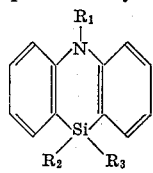

where $R_1$ is an alkyl, aralkyl or cycloalkyl group and $R_2$ and $R_3$ is an aryl, aralkyl, cycloalkyl or alkyl group.

The process of the present invention will be illustrated in reference to the following flow sheet:

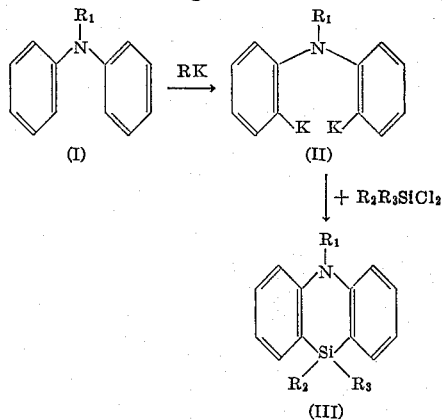

where $R_1$, $R_2$ and $R_3$ are as previously defined and R is typically alkyl or aryl.

In essence the process of the present invention is based upon a direct one-step dimetalation reaction between, for example, N-alkyl diphenylamine (I) with a potassium alkyl or potassium aryl, to produce 2,2'-dipotassio-N-alkyl-diphenylamine (II) preferably a potassium alkyl such as is produced in situ by the reaction between a mixture of potassium metal and n-butyllithium. For example, N-ethyldiphenylamine may be reacted with such a mixture to produce 2,2'-dipotassio-N-ethyldiphenylamine. While the mechanism of such a reaction is not clearly understood it is believed to proceed by the exchange of potassium for lithium in n-butyllithium, then the addition of n-butylpotassium to the diphenylamine and finally the elimination of two moles of butane to produce the dimetalated potassium compound. This reaction is conveniently carried out at room temperature for about an hour and then at about 80° C. for a similar period of time.

The dipotassio compound (II) is then reacted with a dichlorosilane, such as diphenylsilane to produce the desired phenazasiline compound (III). This reaction is suitably carried out at below room temperature, preferably at about 5° C. For example, 2,2'-dipotassio-N-ethyldiphenylamine is reacted with diphenyldichlorosilane to produce 5-ethyl-10,10-diphenylphenazasiline.

The present process is particularly advantageous for the preparation of the phenazasiline compound desired because it only involves two steps and provides the product in rather high yields.

This invention will be illustrated in detail with respect to the specific examples which follow.

EXAMPLE I

*2,2'-Dipotassio-N-Ethyldiphenylamine*

Sixty-six ml. of an n-butyllithium solution in pentane (containing 0.08 g.-mole of n-butyllithium) is evaporated to dryness in vacuo, (0.097 mole) of N-ethyldiphenylamine (142% excess) and 2.80 g. of potassium (0.072 g.-atom) is added and the mixture kept at 80° for 2½ hours while stirred magnetically ($N_2$ blanket). Foaming starts upon mixing the ingredients, becoming gradually weaker, and then ceases completely. The product is 2,2'-dipotassio-N-ethyldiphenylamine.

EXAMPLE II

*5-Ethyl-10,10-Diphenylphenazasiline*

After cooling to room tempertaure, the dark brown reaction mixture of Example I, except for chunks of unreacted potassium and/or lithium, is transferred by a pipette into another flask, washed over 2 x 5 ml. iso-octane, the whole operation being done under a blanket of $N_2$, then diphenyldichlorosilane, 8.23 g. (0.0324 mol.), is added, while the mixture is cooled at 7–8° and stirred. Five ml. of iso-octane and 5 ml. of ether is then added (because of the thickness of the reaction mixture), and the mixture stirred at 25° for 15 minutes, then for 40 minutes at 4–5°.

Ten ml. of isopropanol is then added, the mixture stirred for 1½ hours at 25–30°, then isopropanol is added (10 ml.) followed by water (40 ml.). After the disappearance of the metallic particles, the mixture is extracted with benzene (3 x 20 ml.), the combined benzene extracts washed with conc. HCl (3 x 20 ml., 2 x 50 ml.), washed with water, sodium-hydrocarbonate solution, water again, dried ($MgSO_4$), and evaporated to dryness.

A thick oil (8.58 g.) is obtained. It is dissolved in iso-octane and analyzed by U.V. E percent at 287 mμ is 112 and analyzes for 5-ethyl-10,10'-diphenylphenazasiline (yield 30% of theory).

The oil is dissolved in a mixture of 10 ml. petrol ether and 1 ml. cyclohexane. The solution is decanted and left standing overnight. Thereafter a small oily layer is observed at the bottom of the flask and large shiny crystals on the walls of the flask. The solution is decanted from the oily layer and concentrated at room temperature to about 2 ml., whereupon white crystals are formed which are filtered and washed with methanol, and dried to yield 0.22 g. of pure 5-ethyl-10,10-diphenylphenazasiline.

What is claimed is:
1. A method of producing a compound having the formula:

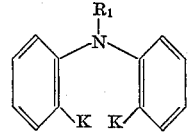

where $R_1$ is selected from the group consisting of alkyl, aralkyl and cycloalkyl radicals, which comprises reacting a compound having the formula:

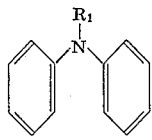

where $R_1$ is as above, with a mixture of potassium metal and an alkyllithium.

2. A method in accordance with claim 1 wherein said lithium compound is n-butyllithium.

References Cited in the file of this patent

UNITED STATES PATENTS 2,238,669    Wiley _____ Apr. 15, 1941

OTHER REFERENCES

Eaborn: "Organosilicon Compounds," Academic Press Inc., New York, publ., 1960, pages 25–26.

Gilman et al.: "Chemistry and Industry," Sept. 20, 1958, pp. 1,227–8.